United States Patent [19]

Ticknor

[11] 4,189,519

[45] Feb. 19, 1980

[54] HEAT SEALABLE RESIN BLENDS

[75] Inventor: William G. Ticknor, Appleton, Wis.

[73] Assignee: American Can Company, Greenwich, Conn.

[21] Appl. No.: 938,226

[22] Filed: Aug. 30, 1978

[51] Int. Cl.² .............................................. C08L 23/08
[52] U.S. Cl. .................................... 428/476; 428/517; 525/222; 525/78
[58] Field of Search ...................... 260/897 B, 876 R; 428/476.1, 517

[56] References Cited

U.S. PATENT DOCUMENTS

| | | | |
|---|---|---|---|
| 3,321,427 | 5/1967 | Tyran | 260/28.5 |
| 3,389,016 | 6/1968 | Holtz et al. | 260/897 B X |
| 3,405,083 | 10/1968 | Morrison et al. | 260/23 |
| 3,615,106 | 10/1971 | Flanagan et al. | 281/21 |
| 4,022,850 | 5/1977 | Booth et al. | 260/897 B |
| 4,075,290 | 2/1978 | Denzel et al. | 260/897 A |

*Primary Examiner*—Carman J. Seccuro
*Attorney, Agent, or Firm*—Robert P. Auber; George P. Ziehmer; Ira S. Dorman

[57] ABSTRACT

A resin blend for producing a peelable heat seal, which does not produce "angel hair" upon separation, includes polybutylene and a copolymer of ethylene with, for example, vinylacetate or methyl acrylate. Typical substrates are high density polyethylene and nylon.

28 Claims, No Drawings

HEAT SEALABLE RESIN BLENDS

BACKGROUND OF THE INVENTION

A highly conventional and widely used method of packaging utilizes a synthetic resinous film, which is disposed about the product and heat sealed to enclose it therewithin. In many instances, it is desirable to open the package by peeling apart the sealed films, and this must generally be done without destroying the integrity of the film itself. Accordingly, to provide a satisfactory package of this type, a balance of properties is necessary; i.e., the seal strength must be adequate to maintain the package in a closed and protective condition, while also exhibiting such release propeties as will permit opening by peeling when desired.

A variety of resins are commercially available, which provide excellent heat seals over practical ranges of operating conditions, typical of which are the copolymers of ethylene with vinyl acetate (EVA), methyl acrylate (EMA), and similar ethylenically-unsaturated esters. However, the bonds produced with such copolymers are of such a nature such that separation usually cannot be achieved without damage to the film.

It has previously been proposed to adulterate a heat sealing layer of, for example, EVA, with SURLYN ionomer, to thereby lower the strength of the seal so as to permit peeling at the interface. While somewhat successful, the approach has suffered from the serious disadvantage of causing stringiness, or "angel hair", to be produced upon separation of the films.

High molecular weight, crystalline, isotactic polybutylene resins (synthesized from butene-1 monomer), such as those which are commercially available from the Shell Chemical Corporation under the trademark WITRON, are known to have applications in combination with other polyolefins, such as polyethylene and polypropylene. Also, it is known from U.S. Pat. No. 4,075,290 that heat sealable polymer blends can be produced utilizing at least about 80 weight percent of polybutene-1 (described therein as a butene-1 polymer) with up to about 20 percent of ethylene/propylene copolymer, ethylene/butene-1 copolymer, or polypropylene. However, so far as is known, blends of heat sealable copolymers of the sort and with the properties hereinbefore described have not previously been proposed, in combination with a polybutylene resin or with any other polymer.

Accordingly, it is an object of the present invention to provide a novel synthetic resinous blend, which is capable of providing a peelable heat seal, and from which strings, or "angel hair", is not produced upon separation.

It is also an object of the invention to provide a novel film, and a heat sealed structure utilizing the same, which incorporate such a blend.

SUMMARY OF THE DISCLOSURE

It has now been found that certain of the foregoing and related objects of the invention are readily attained in a resin blend comprised of at least two components. About 50 to 90 weight percent of the blend is a copolymer of about 80 to 96 weight percent of ethylene and about 20 to 4 weight percent of an ethylenically-unsaturated esters; conversely, about 50 to 10 weight percent of the blend is polybutylene. The blend has a heat sealing temperature of about 160° to 300° Fahrenheit, as determined at the sealing jaws, and it affords a peel strength of about 0.3 to 3 pounds.

In preferred embodiments, the blend comprises about 60 to 80 weight percent of the copolymer, and about 40 to 20 weight percent of polybutylene. The heat sealing temperature will be about 180° to 220° Fahrenheit, and the peel strength afforded will be about 0.5 to 1.5 pounds. Ideally, the comonomer which is polymerized with ethylene will be selected from the group consisting of vinyl acetate and methyl acrylate.

In certain instances, a copolymer containing about 12 to 14 weight percent of vinyl acetate, and comprising about 80 to 85 weight percent of the blend, will produce highly beneficial results. In other cases, a copolymer containing about 4.5 weight percent of vinyl acetate, in a blend including a quantity of a graft copolymer of an unsaturated, fused ring, carboxylic acid anhydride upon highly density polyethylene, will be outstandingly effective. When the comonomer is methyl acrylate, the copolymer will desirably contain about 80 weight percent of ethylene and about 20 weight percent of methyl acrylate, and will comprise about 80 to 85 weight percent of the blend. Finally, the polybutylene employed in the blend will be a high molecular weight, flexible, crystalline, isotactic polymer having a density of about 0.91 and a melt index of about 0.4 to 20; most desirably, the melt index will be about 1.0

Certain objects of the invention are attained in a film comprising a substrate, and a resin blend of the foregoing description, typical substrates being high density polyethylene and nylon. In general, the film will have an overall thickness of about 1.25 to 2.5 mils, and the blend layer will comprise about 10 to 30 percent of its thickness. Normally, the film will be a coextrudate of the resin blend and the substrate.

DETAILED DESCRIPTION OF THE PREFERRED EMBODIMENT

Exemplary of the efficacy of the present invention are the following examples:

EXAMPLE I

Polybutylene (Witron 1600A) having a melt index of about 1.0 and a density of about 0.91 and containing a small amount of an antiblocking agent, was dry blended in a tumble mixer with one of several heat sealable copolymers. The resultant blend was coextruded (at a die temperature of about 400° Fahrenheit) with a high density polyethylene resin through a circular die, into the form of a bubble, so as to produce from the coextrudate a blown film about 2 mils thick, with the resin blend consituting about 15 percent of its thickness. After cooling, one-inch wide strips were cut from the film at locations across its width (so as to ensure that a representative sampling was obtained), and opposite sides of the samples were then heat sealed together with the resin blend layers in face-to-face contact, using 40 pounds per square inch of pressure and a dwell time of about half a second. Five samples of the film were sealed at each of several jaw temperatures, and then were subjected to peel strength analysis by pulling across the seal, using a commercial tensile testing device. Table I sets forth the results observed:

TABLE I

| COPOLYMER | | | | Strength |
|---|---|---|---|---|
| Type | % Comonomer | % of Blend | Temp. (°F.) | (LBS) |
| EVA | 12 | 80 | 230 | 0.4 |

TABLE I-continued

| COPOLYMER | | | | Strength |
|---|---|---|---|---|
| Type | % Comonomer | % of Blend | Temp. (°F.) | (LBS) |
| | | | 245 | 1.7 |
| | | | 265 | 3.0 |
| EVA | 14 | 80 | 225 | 0.3 |
| | | | 230 | 0.5 |
| | | | 260 | 1.7 |
| | | | 315 | 3.0 |
| EMA | 20 | 80 | 215 | 0.3 |
| | | | 220 | 0.7 |
| | | | 225 | 1.5 |
| | | | 235 | 1.9 |
| | | | 250 | 3.2 |

It will be appreciated that, in the foregoing table, the comonomer referred to is either vinyl acetate or methyl acrylate, and that polybutylene constitutes the remaining 20 percent of the blend; the peel strength set forth for each temperature represents the average of the values obtained for the five samples tested. In no instance was any stringiness observed to occur upon peeling.

EXAMPLE II

Example I was substantially repeated, utilizing however a 2.5 mils thick film of 55 percent PLEXAR II, 30 percent nylon and (as the heat sealing layer) 15 percent of polybutylene-containing PLEXAR I. The PLEXAR resins are commerically available from the Chemplex Company of Rolling Meadows, Illinois, and are described in U.S. Pat. Nos. 4087587 and 4087588. PLEXAR I is essentially an EVA copolymer having a vinyl acetate content of about 4.5 weight percent, but containing a quantity of a graft copolymer of an unsaturated, fused ring, carboxylic acid anhydride upon high density polyethylene. In this Example, the proportions of polybutylene and copolymer (PLEXAR) in the blend were about 15 and 85 percent, respectively. Samples were heat sealed together using a Sentinel Heat Sealer, Model 12ASL, manufactured by Packaging Industries Incorporated, Hyannis, Massachusetts, the same equipment as was used in Example I. The sealer had one metal jaw and one rubber jaw. Both jaws were heated, and both were provided with TEFLON covers. Table II sets forth results observed.

TABLE II

| Temp. (°F.) | Strength (LBS) |
|---|---|
| 210 | 0.3 |
| 220 | 0.8 |
| 240 | 1.5 |
| 250 | 1.6 |
| 260 | 1.7 |
| 270 | 1.7 |
| 300 | 1.8 |

While the ethylenically-unsaturated ester of the copolymer employed may be any which will result in a blend having the characteristics hereinbefore specified, vinyl acetate and methyl acrylate are preferred; a possible alternative is, for example, ethyl acrylate. The amount of and nature of the ester moiety will determine, to an extent, the optimal heat sealing temperature and the processing characteristics of the blend, which therefore represent practical constraints upon the resin composition. It should be appreciated that, in the ideal case, the film will be heat selable on commercial equipment over a range of about 40 Fahrenheit degrees, and at the temperatures specified herein, depending somewhat upon thicknesses and the specific substrate film employed (e.g., nylon may require a higher sealing temperature than polyethylene, because of its greater insulating effect). While a jaw temperature of 300° Fahrenheit will generally be a practical upper limit, higher temperatures may be used, so long as the film is not damaged by the heat applied, and so long as the resultant increase in peel strength is acceptable. In most instances, an upper temperature of 250° Fahrenheit will be preferred, and 200° Fahrenheit will generally be most desirable.

It is believed that the composition of the polybutylene resin employed may vary considerably, and still afford th advantages herein described, as long as it is at least somewhat incompatible with the copolymer used in the blend. While the theory of the observed effect is not entirely understood, it is hypothesized that the polybutylene produces discontinuities on the surface of the heat seal layer, at which bonding does not occur under the conditions of sealing. That, coupled with the nature of the polybutylene resin, not only promotes facile peeling, but also avoids the stringiness that characterizes comparable prior art materials.

Thus, it can be seen that the present invention provides a novel synthetic resinous blend which is capable of providing a peelable heat seal, and from which strings, or "angel hair" is not produced upon separation. A novel film, and a heat sealed structure utilizing the same, which incorporate such a blend, are also provided.

Having thus described the invention, I claim:

1. A resin blend for producing a peelable heat seal between substrates on which it is carried, comprising: (a) about 50 to 90 weight percent of a copolymer of about 80 to 96 weight percent ethylene and about 20 to 4 weight percent of an ethylenically unsaturated ester; and (b) about 50 to 10 weight percent of a crystalline, isotactic polybutylene having a melt index of about 0.4 to 20, said blend having a heat sealing temperature of about 160° to 300° Fahrenheit, as determined at the sealing jaws, and affording a peel strength of about 0.3 to 3 pounds between resin blend layers heat sealed at said heat sealing temperatures.

2. The blend of claim 1 comprising about 60 to 80 weight percent of said copolymer and about 40 to 20 weight percent of polybutylene.

3. The blend of claim 2 wherein said heat sealing temperature is about 180° to 220° Fahrenheit, and said peel strength is about 0.5 to 1.5 pounds.

4. The blend of claim 1 wherein said ethylenically-unsaturated ester is selected from the group consisting of vinyl acetate and methyl acrylate.

5. The blend of claim 4 wherein said ethylenically-unsaturated ester is vinyl acetate.

6. The blend of claim 5 wherein said copolymer contains about 12 to 14 weight percent of vinyl acetate, and comprises about 80 to 85 weight percent of said blend.

7. The blend of claim 5 wherein said copolymer contains about 4.5 weight percent of vinyl acetate, said blend including a quantity of a graft copolymer of an unsaturated, fused ring, carboxylic acid anhydride upon high density polyethylene.

8. The blend of claim 4 wherein said copolymer is of about 80 weight percent ethylene and about 20 weight percent methyl acrylate.

9. The blend of claim 8 wherein said copolymer comprises about 80 to 85 weight percent of said blend.

10. The blend of claim 1 wherein said polybutylene is a high molecular weight, flexible, crystalline, isotactic polymer having a density of about 0.91 and a melt index of about 0.4 to 20.

11. The blend of claim 10 wherein said melt index is about 1.0.

12. A film adapted for producing a peelable heat seal, comprising a substrate and a resin blend carried thereon, said resin blend comprising (a) about 50 to 90 weight percent of a copolymer of about 80 to 96 weight percent of ethylene and about 20 to 4 weight percent of an ethylenically unsaturated ester; and (b) about 50 to 10 weight percent of a crystalline, isotactic polybutylene having a melt index of about 0.4 to 20, said blend having a heat sealing temperature of about 160° to 300° Fahrenheit, as determined at the sealing jaws, and affording a peel strength of about 0.3 to 3 pounds between resin blend layers of the substrate heat sealed at said heat sealing temperatures.

13. The film of claim 12 comprising about 60 to 80 weight percent of copolymer and about 40 to 20 weight percent of polybutylene, said heat sealing temperature being about 180° to 220° Fahrenheit, and said peel strength being about 0.5 to 1.5 pounds.

14. The film of claim 12 wherein said ethylenically-unsaturated ester is selected from the group consisting of vinyl acetate and methyl acrylate.

15. The film of claim 14 wherein said copolymer contains about 12 to 14 weight percent of vinyl acetate, and comprises about 80 to 85 weight percent of said blend.

16. The film of claim 14 wherein said copolymer contains about 4.5 weight percent of vinyl acetate, said blend including a quantity of a graft copolymer of an unsaturated, fused ring, carboxylic acid anhydride upon high density polyethylene.

17. The film of claim 14 wherein said copolymer is of about 80 weight percent ethylene and about 20 weight percent methyl acrylate.

18. The film of claim 12 wherein said polybutylene is a high molecular weight, flexible, crystalline, isotactic polymer having a density of about 0.91 and a melt index of about 0.4 to 20.

19. The film of claim 14 wherein said substrate is of high density polyethylene.

20. The film of claim 16 wherein said substrate is of nylon.

21. The film of claim 14 wherein said film has an overall thickness of about 1.25 to 2.5 mils.

22. The film of claim 21 wherein said blend comprises about 10 to 30 percent of the thickness of said film.

23. The film of claim 14 wherein said film is a coextrudate of said blend and said substrate.

24. A resin blend for producing a peelable heat seal between substrates on which it is carried, comprising: (a) about 80 weight percent of a copolymer of about 88 to 80 weight percent ethylene and about 12 to 20 weight percent vinyl acetate; and (b) about 20 weight percent of a high molecular weight, crystalline, isotactic polybutylene resin having a density of about 0.91 and a melt index of about 1.0, said blend having a heat sealing temperature of about 215° to 300° Fahrenheit, as determined at the sealing jaws, and affording a peel strength of about 0.3 to 3.0 pounds between resin blend layers heat sealed at said heat sealing temperatures.

25. A resin blend for producing a peelable heat seal between substrates on which it is carried, comprising: (a) about 85 weight percent of an ethylene-vinyl acetate copolymer having a vinyl acetate content of about 4.5 weight percent and containing a quantity of a graft copolymer of an unsaturated, fused ring, carboxylic acid anhydride upon high density polyethylene, and (b) about 15 weight percent of a crystalline, isotactic polybutylene resin having a density of about 0.91 and a melt index of about 1.0; said blend having a heat sealing temperature of about 210° to 300° Fahrenheit, as determined at the sealing jaws, and affording a peel strength of about 0.3 to about 1.8 pounds between resin blend layers heat sealed at said heat sealing temperatures.

26. A resin blend for producing a peelable heat seal between substrates on which it is carried comprising: (a) about 80 weight percent of an ethylene-methyl acrylate copolymer having a methyl acrylate content of about 20 weight percent; and (b) about 20 weight percent of a crystalline, isotactic polybutylene having a melt index of about 1.0, said blend having a heat sealing temperature of about 215° to 250° Fahrenheit and affording a peel strength of about 0.3 to about 3 pounds between resin blend layers heat sealed at said heat sealing temperature.

27. A film adapted for producing a peelable heat seal, said film being a coextrudate of a high density polyethylene resin and, as the heat sealing layer, a resin blend comprising (a) about 50 to 90 weight percent of a copolymer of about 80 to 96 weight percent ethylene and about 20 to 4 weight percent vinyl acetate or methyl acrylate; and (b) about 50 to 10 weight percent of a crystalline, isotactic polybutylene having a melt index of about 1.0, said blend layer having a heat sealing temperature of about 160° to 300° Fahrenheit, as determined at the sealing jaws, and affording a peel strength of about 0.3 to 3 pounds between resin blend layers of said film heat sealed at said heat sealing temperatures.

28. A film adapted for producing a peelable heat seal, said film being a coextrudate comprising nylon and, as the heat sealing layer, a resin blend comprising (a) about 85 weight percent of an ethylene-vinylacetate copolymer having a vinyl acetate content of about 4.5 weight percent and containing a quantity of a graft copolymer of an unsaturated, fused ring, carboxylic acid anhydride upon high density polyethylene; and (b) about 15 weight percent of crystalline, isotactic polybutylene having a melt index of about 1.0, said blend layer having a heat sealing temperature of about 210° to 300° Fahrenheit, as determined at the sealing jaws, and affording a peel strength of about 0.3 to 1.8 pounds between resin blend layers of said film heat sealed at said heat sealing temperatures.

* * * * *